W. H. STOCKWELL.
AUTOMOBILE TOWING ATTACHMENT.
APPLICATION FILED SEPT. 22, 1913.
1,116,751. Patented Nov. 10, 1914.
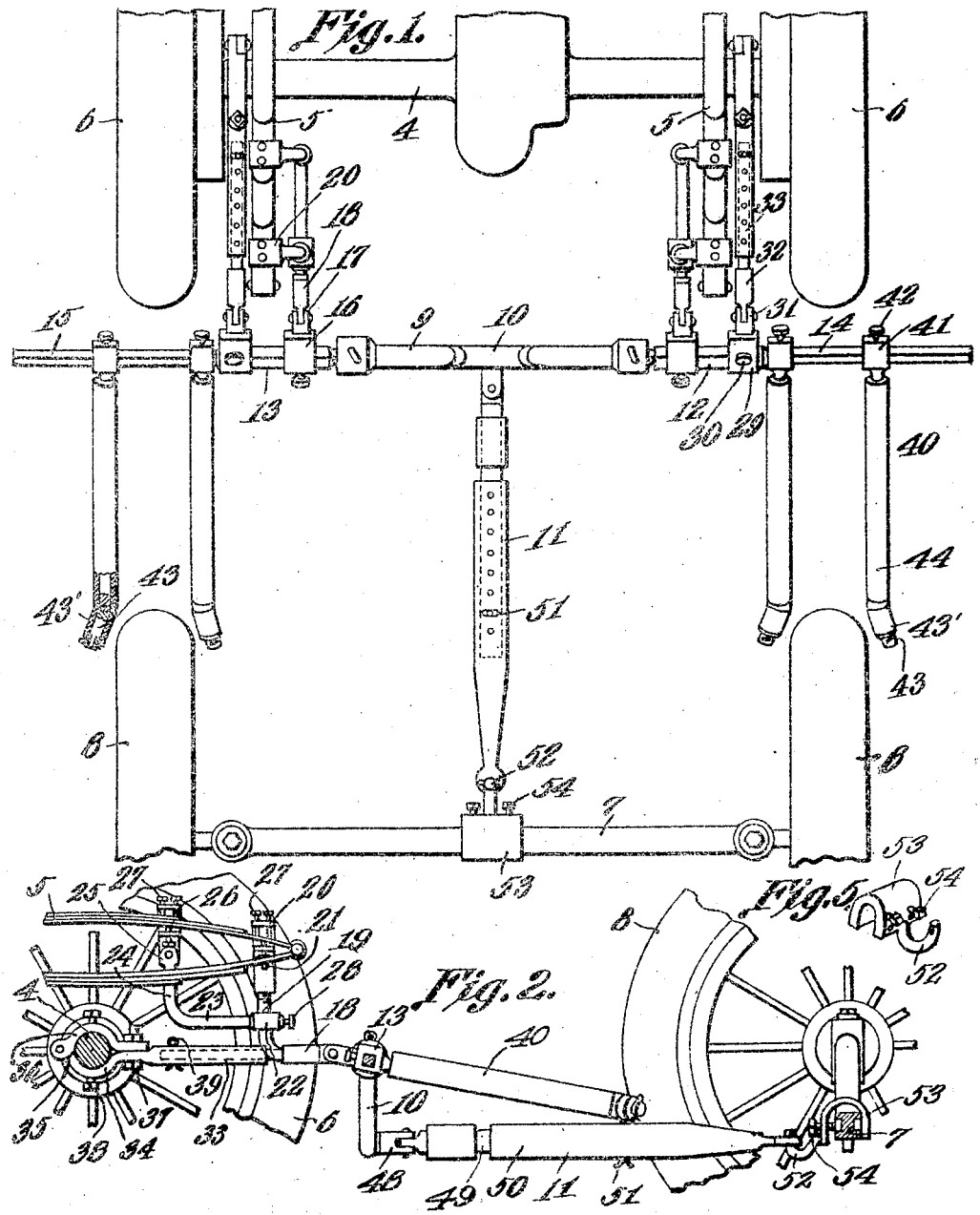
William H. Stockwell,
Inventor
Witnesses
by C. A. Snow & Co.
Attorneys

UNITED STATES PATENT OFFICE.

WILLIAM H. STOCKWELL, OF SHREVEPORT, LOUISIANA.

AUTOMOBILE TOWING ATTACHMENT.

1,116,751.　　　Specification of Letters Patent.　　Patented Nov. 10, 1914.

Application filed September 22, 1913. Serial No. 791,185.

*To all whom it may concern:*

Be it known that I, WILLIAM H. STOCKWELL, a citizen of the United States, residing at Shreveport, in the parish of Caddo and State of Louisiana, have invented a new and useful Automobile Towing Attachment, of which the following is a specification.

This invention relates to improvements in automobile towing attachments.

An object of the present invention is to provide improved means whereby the towing attachment may be secured to the towing and towed machines and maintain the axles thereof so that there is no interference of the wheels when making a curve.

A further object of the invention is to provide an attachment which may be either permanently or detachably secured to the trouble wagon of a garage and which is securable to the front axle of a second automobile, so that the second automobile may be towed and steered without requiring an operator for the second car.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings accompanying the specification and forming a part thereof, the preferable form of my invention is illustrated, in which—

Figure 1 is a plan view of my improved attachment and fragmentally illustrating portions of the towing and towed car. Fig. 2 is a cross sectional view thereof. Figs. 3 and 4 are detail views of a steering attachment to be used when the towed car is equipped with wire wheels. Fig. 5 is a view in perspective of the clamp or coupling *per se.*

Referring to the drawings in which similar reference numerals designate corresponding parts of the several views, the numeral 4 designates the rear axle of the trouble or towing car and is provided with the usual springs 5 and wheels 6 attached thereto. The front axle of the towed car is designated at 7 and the wheels 8. As will be apparent from reference to Fig. 2, the front axle 7 has been designated as of the conventional I-beam, but it is to be noted that the device herein described may be used with equal facility with cars provided with tubular front axles.

A bar extends transversely between the two machines and includes a central member 9 provided with a lowered central portion 10 whereby the pulling rod 11 which is secured thereto and to the axle 7 will be maintained in a substantially horizontal position. Detachably secured to the ends of the central member 9, are the square rods 12 and 13 and which latter include the extremities 14 and 15, which are not subject to the stress involved in the towing of the machine but serve as means for the turning of the wheels 8 of the towed car and so are made somewhat smaller in cross section than the portions 12 and 13. The cross sectional contour of the rod 13 is illustrated in Fig. 2, and may be rectangular or of other regular contour so that the members which are attached thereto, will be prevented from rotating about the same as a center.

In order to rigidly secure the transversely extending segmental rod member to the rear axle 4 of the towing or trouble car, a square sleeve 16 is provided and to the bifurcated projection 17 of which is pivotally secured the arm 18, the latter being bent, as illustrated in Fig. 2, into a vertical position, as at 19. An offset attaching member 20 is connected to the arm 19 by means of a pivoted joint 21. A sleeve or collar 22 is slidably mounted upon the upstanding arm 19 and carries the outstanding arm 23 which projects upwardly as at 24, and has a bifurcated enlarged end 25 to which is pivotally secured, the lower extremity of an attaching member 26. The attaching members 20 and 26 are provided with a plurality of adjustable set screws or lag bolts 27 which are adapted to clamp and thus rigidly engage the leaves of the automobile springs 5. The collar or sleeves 22 and 16 are also provided with set screws 28 so that they may be rigidly locked in place and held in such position.

A similar device is positioned upon the rod 12 and adapted to engage the spring at that side of the car. An auxiliary attaching means is had for the securing of the transversely extending segmental rod to the towing car and comprises the collar or sleeve 29 slidably mounted upon the rod 12 and held thereto, by a set screw 30 or other equivalent means, and to the bifurcated projection 31 of which is pivotally secured the rod 32 which latter is slidably mounted within a sleeve 33, the end of which is bent downwardly as at 34 and upwardly as at 35 so as to extend one-half the distance around the axle 4. To the end 35 is pivotally secured the cap 36 which is adapted to embrace the axle 4 and rigidly held thereto by a bolt 37. The set screws 38 extend through the cap 36 and the portion 34 and rigidly engage the axle 4 preventing any longitudinal movement of the attaching member with respect thereto. The rod 32 and sleeve 33 are provided with a plurality of apertures extending therethrough and which may be brought into registration for the reception of the holding pin 39 whereby considerable range of adjustment is had.

Positioned upon the extremities 14 and 15 of the rods 12 and 13, respectively, are the steering fingers 40, which include the collars 41, the set screws 42 extending therethrough, whereby the said collars may be locked in adjusted position upon the rod 14. The outer extremities of the fingers 40 are inclined as at 43 and the rollers 44 preferably formed of rubber or of some light material, are mounted upon the portions 40 and 43 of the fingers and are adapted to contact with the wheel tires and provide that there will be no excessive friction exerted therebetween. There are four of the described fingers, there being two upon each of the rods 14 and 15 and engage the sides of the automobile or wheels so that as the front car turns, the wheels of the rear car will be turned the corresponding amount to prevent interference in making curves.

A somewhat modified form of steering finger is illustrated in Figs. 3 and 4, and includes the sleeve or collar 44' with the securing set screw 45 extending therethrough, and with the finger 46 and roller 47 disposed at an angle with respect to the transverse axis of the sleeve or collar opening. The fingers and rollers are offset in one direction only, as illustrated in Fig. 4, and when positioned upon one of the rods 14 or 15 extend horizontally but obliquely to a right line let fall upon the transverse segmental rod composed of the portions 9 and 15.

The lower central portion 10 of the member 9 is provided with a rearwardly extending bifurcated portion 48 to which is pivotally secured, the towing rod, the latter including the rearwardly extending bar 49 which fits within a sleeve 50, both of which are provided with apertures extending therethrough and held in adjusted relation by means of a pin 51. Thus providing means whereby the distance between the axles 4 and 7 may be nicely regulated so that the steering fingers will properly contact with the sides of the wheel tires. To the rear extremity of the sleeve 50 is pivotally secured, the axle engaging member including the arm 52 and the three quarter sleeve 53. The sleeve 53 is adapted to extend over and engage the axle 7, as illustrated in Fig. 2. Suitable set screws 54 are provided, whereby the sleeve or clamp 53 may be rigidly locked to the axle and prevented from moving with relation thereto.

With the foregoing apparatus, the distance between the axles of the towed and towing cars may be varied, as may be the distance between the transversely extending bars 9, 12, 13, 14, 15 and the axle 4, thus allowing the attachment to be used in connection with cars having wheels of different diameters. When the front and towing car turns a corner or is deflected from its path, the transversely extending rod member will be accordingly deflected with the result that the fingers will engage the front wheels of the rear and towed car so that the wheels will be properly steered with respect to the axle 4. It is to be noted that the fingers will contact with the wheel upon the inner portion of the vehicle and that the fingers adjacent the wheel which negotiates the outer part of the turn swings clear of the wheel and allows the same to be turned the proper amount. Should the occasion arise when it is not desirable nor convenient to attach the towing device to the axle, the same can be omitted and the spring engaging members are adequately able to hold the transversely extending bar rigidly in its proper position. When the vehicle to be towed is provided with the wire spoke wheels, the fingers which contact with the outer portions of the wheels 8—8, are removed and the steering fingers illustrated in Figs. 3 and 4 are substituted therefor, so that when the cars negotiate a turn, there will be no likelihood of the outer steering finger interfering with the turning of the wheels by contacting with the wire spokes which are of a bulging and outwardly extending nature.

As shown at the extreme left in Fig. 1, the terminal 43, is covered with a removable rubber roller 43', which may be easily removed and renewed, as the same is mounted for quick detachment.

Having thus fully described my invention, what I claim is:—

1. The combination with a towing and towed car, of a towing attachment comprising a segmental rod member provided with a central downwardly offset portion, means adjustably secured thereto adapted to engage the rear spring of a towing car and to hold said transversely extending member rigidly in position, means engaging the offset central portion of the said transversely extending rod member extending rearwardly therefrom and adapted to engage the front axle of the towed car, and steering fingers adjustably mounted upon the outer extremities of said transversely extending rod member engaging the sides of the tires of the front wheels of the towed car to steer said wheels.

2. In an automobile towing and steering device, the combination of a transversely extending central rod member, collars adjustably secured thereto, arms pivotally secured to said collars and provided with means for rigidly engaging the rear springs of the towing car, to thereby hold said transversely extending rod member above the ground spaced a distance from the back wheels of the towing car and rigidly held so positioned, a telescoping towing rod pivotally engaging the said transversely extending rod member, means for locking said rod at adjusted lengths, means secured at the extreme end of said towing rod adapted to detachably engage the front axle of the towed car, collars disposed upon the outer extremities of the said transversely extending rod member, rearwardly extending fingers carried thereby and provided with inclined ends, and anti-frictional rollers mounted upon the said fingers and adapted to engage the towed car tires of the front wheels for the steering thereof.

3. In an automobile towing and steering device, the combination of a transversely extending segmental rod member, means pivotally and adjustably engaging the same adapted to rigidly and detachably engage the rear springs of the towing car and adapted to hold said rod member rigidly in its proper position, steering fingers adjustably and rigidly secured to the extremities of said transversely extending rod member, anti-frictional rollers rotatably mounted thereon, said resilient fingers and rollers provided with inclined ends, a towing rod pivotally secured to the said transversely extending rod member and including an extensible central portion, means for locking the same in extended adjusted position, and a segmental collar fitting over the front axle of the towed car, means for locking the same thereto, said segmental collar pivotally secured to the said towing rod and adapted to hold the axles of the towed and towing cars in spaced relation, the resilient fingers steering the front wheels of the towed car.

4. A towing attachment for vehicles, comprising a rigid structure, means carried thereby for securing it to a towing vehicle, means carried thereby for securing it to a towed vehicle, and rearwardly extending fingers carried thereby and provided with inclined ends adapted to engage the front wheel of the towed vehicle for the steering thereof.

5. A towing attachment for vehicles, comprising a rigid structure, means carried thereby for securing it to a towing vehicle, means carried thereby for securing it to a towed vehicle, rearwardly extending fingers carried thereby and provided with inclined ends, and anti-friction rollers mounted upon said fingers adapted to engage the front wheel of the towed car for the steering thereof.

6. A towing attachment for vehicles, comprising a substantially rigid structure, means carried thereby for securing it to a towing vehicle, means carried thereby for securing it to a towed vehicle, and rearwardly extending diverging fingers carried by said structure adapted to engage the front wheel of the towed car for the steering thereof.

7. A towing attachment for vehicles, comprising a substantially rigid structure, means carried thereby for securing it to the rear spring of the towing vehicle, means carried thereby for securing it to the towed vehicle, and means carried thereby engaging the front wheel of the towed vehicle for the steering thereof.

8. A towing attachment for vehicles, comprising a cross bar, means adjustably secured thereto adapted to engage the towing vehicle, rearwardly extending fingers adjustably mounted on the said cross bar, adapted to contact with the front wheels of the towed vehicle for the steering thereof, and a member carried by the said cross bar adapted to engage the towed vehicle.

In testimony that I claim the foregoing as my own, I have hereto affixed my signature in the presence of two witnesses.

WILLIAM H. STOCKWELL.

Witnesses:
SELINA WILLSON,
I. E. SIMPSON.